United States Patent
Stent et al.

(10) Patent No.: US 10,699,144 B2
(45) Date of Patent: Jun. 30, 2020

(54) SYSTEMS AND METHODS FOR ACTIVELY RE-WEIGHTING A PLURALITY OF IMAGE SENSORS BASED ON CONTENT

(71) Applicant: Toyota Research Institute, Inc., Los Altos, CA (US)

(72) Inventors: Simon A. I. Stent, Cambridge, MA (US); John Gideon, Howell, MI (US); Luke S. Fletcher, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 247 days.

(21) Appl. No.: 15/889,404

(22) Filed: Feb. 6, 2018

(65) Prior Publication Data

US 2019/0130200 A1    May 2, 2019

Related U.S. Application Data

(60) Provisional application No. 62/577,470, filed on Oct. 26, 2017.

(51) Int. Cl.
*G06K 9/00* (2006.01)
*G06K 9/62* (2006.01)
*G05D 1/00* (2006.01)

(52) U.S. Cl.
CPC ....... *G06K 9/00845* (2013.01); *G05D 1/0088* (2013.01); *G06K 9/6228* (2013.01); *G06K 9/6288* (2013.01); *G05D 2201/0213* (2013.01)

(58) Field of Classification Search
CPC ............. G06K 9/00845; G06K 9/6288; G06K 9/6228; G05D 1/0088; G05D 2201/0213
See application file for complete search history.

(56) References Cited

U.S. PATENT DOCUMENTS 7,346,192 B2    3/2008    Yuasa et al.
10,074,024 B2 *  9/2018    el Kaliouby ........... G16H 50/20
(Continued)

FOREIGN PATENT DOCUMENTS

| CN | 101224113 | 2/2012 |
| CN | 104952121 | 9/2015 |
| CN | 106446811 | 2/2017 |

OTHER PUBLICATIONS

Wen-Chang Cheng et al., "Real-Time Driver Gaze Direction Detection Using the 3D Triangle Model and Neural Networks", URL: http://ieeexplore.ieee.org/abstract/document/6664666, Published/Accessed: Nov. 14, 2013.

*Primary Examiner* — Siamak Harandi
(74) *Attorney, Agent, or Firm* — Dinsmore & Shohl LLP

(57) ABSTRACT

Systems and methods for monitoring a user by a plurality of image sensors are disclosed. The system includes a plurality of image sensors that output content descriptive of one or more visual attributes of the user, where each of the image sensors are positioned at a unique angle facing a user. The system also includes one or more processors and one or more non-transitory memory modules communicatively coupled to the one or more processors. The non-transitory memory modules storing machine-readable instructions that, when executed, cause the one or more processors to receive the content from the plurality of image sensors, and assign respective weights to each of the plurality of image sensors based on the content. The respective weights of the plurality of image sensors are actively re-weighted over a period of time. The processors are also caused to merge the content of the plurality of image sensors together.

20 Claims, 4 Drawing Sheets

(56) References Cited

U.S. PATENT DOCUMENTS

2009/0171232 A1     7/2009   Hu et al.
2016/0098592 A1     4/2016   Lee et al.
2019/0019068 A1*   1/2019   Zhu .................... G06K 9/00302

* cited by examiner

SYSTEMS AND METHODS FOR ACTIVELY RE-WEIGHTING A PLURALITY OF IMAGE SENSORS BASED ON CONTENT

CROSS-REFERENCE TO RELATED APPLICATIONS

This application claims the benefit of U.S. Provisional Application No. 62/577,470, entitled "MULTI-CAMERA DEEP NEURAL NETWORK FOR DETECTING ELEVATED ALERTNESS IN DRIVERS," filed Oct. 26, 2017, the entirety of which is hereby incorporated by reference.

TECHNICAL FIELD

Embodiments described herein generally relate to systems including a plurality of image sensors and, more specifically, to systems including a plurality of image sensors that face a user, where the system is configured to actively re-weight the image sensors based on their content.

BACKGROUND

Autonomous systems may monitor various aspects of a vehicle such as, but not limited to, vehicle speed, the surrounding environment, weather conditions, and the manipulation of any system by a driver (e.g., the degree to which a driver may turn the steering wheel or press upon a brake). Another aspect the autonomous system may monitor is the driver's face. More specifically, the driver's face may be monitored to detect characteristics such as gaze direction, mental state, emotion, identity, and the like. A single camera or other image sensor may be provided to monitor the driver's face, and a vehicle computer may determine information based on data captured by the cameras.

Sometimes conventional cameras may not be able to monitor a portion or all of the driver's face, which may affect the ability of the system to determine characteristics such as emotion, gaze direction, and the like. For example, a driver may move his or her hands in a direction and unintentionally occlude the camera for a few moments. Other components of the vehicle such as the steering wheel, dashboard, or rear view mirror may also occlude the camera as well. In another example, the camera may be unable to view a portion of the driver's face. For instance, facial features such as the driver's eyes or mouth may not be captured by the camera for reasons such as vantage point or due to insufficient lighting. Furthermore, the system may not be able to determine gaze direction if the driver's eyes are not visible. The system may be unable to determine some types of emotions if the driver's eyes or mouth are not visible.

SUMMARY

In one embodiment, a system includes a plurality of image sensors that output content descriptive of one or more visual attributes of the user, where each of the image sensors are positioned at a unique angle facing a user. The system also includes one or more processors and one or more non-transitory memory modules communicatively coupled to the one or more processors. The non-transitory memory modules storing machine-readable instructions that, when executed, cause the one or more processors to receive the content from the plurality of image sensors, and assign respective weights to each of the plurality of image sensors based on the content. The respective weights of the plurality of image sensors are actively re-weighted over a period of time. The processors are also caused to merge the content of the plurality of image sensors together. The processors are also caused to transform the single representation of the content into a task output. The task output is representative of one or more physical attributes of the user.

In another embodiment, a vehicle includes a plurality of image sensors that output content descriptive of one or more visual attributes of the user, where each of the image sensors are positioned at a unique angle facing a user. The vehicle also includes one or more processors and one or more non-transitory memory modules communicatively coupled to the one or more processors. The non-transitory memory modules storing machine-readable instructions that, when executed, cause the one or more processors to receive the content from the plurality of image sensors, and assign respective weights to each of the plurality of image sensors based on the content. The respective weights of the plurality of image sensors are actively re-weighted over a period of time. The processors are also caused to merge the content of the plurality of image sensors together. The processors are also caused to transform the single representation of the content into a task output. The task output is representative of one or more physical attributes of the user. The processors are also caused to autonomously control at least one vehicle system based on the task output.

In yet another embodiment, a method includes receiving, by a computer, content from a plurality of image sensors. The plurality of image sensors output content descriptive of one or more visual attributes of a user and are positioned at a unique angle facing the user. The method also includes assigning respective weights to each of the plurality of image sensors based on the content. The respective weights of the plurality of image sensors are actively re-weighted over a period of time. The method also includes merging the content of the plurality of image sensors together based on the respective weights to create a single representation of the content. Finally, the method includes transforming the single representation of the content into a task output. The task output is representative of one or more physical attributes of the user.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
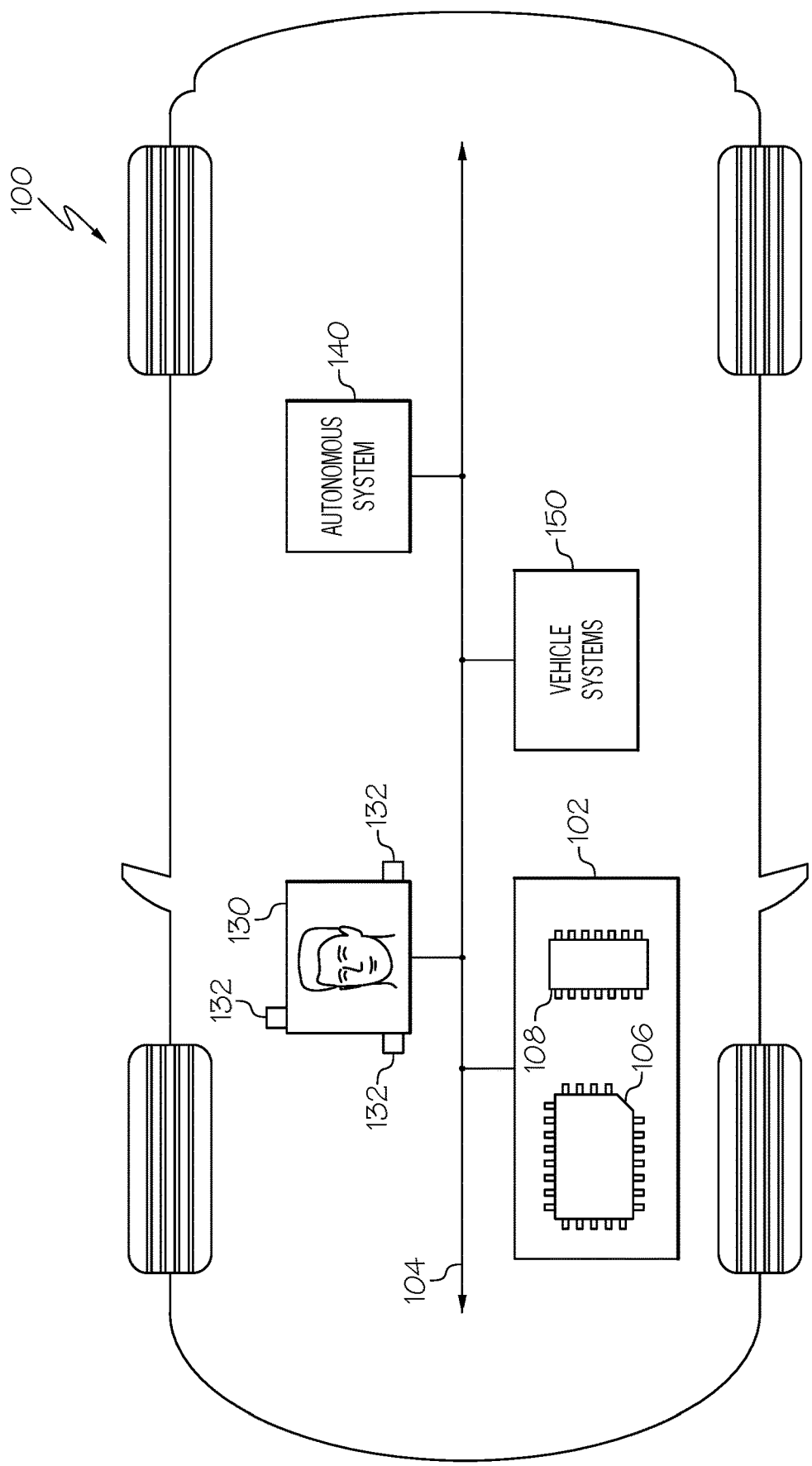
FIG. 1 schematically depicts an example vehicle system including a plurality of cameras for monitoring the face of a driver, according to one or more embodiments shown and described herein.

The embodiments disclosed herein are directed to vehicle systems including a plurality of driver-facing image sensors that are each positioned in a unique location, where the system actively re-weights the content of each sensor based on which sensor produces the most informative content to determine one or more physical attributes of the driver. The system merges the content of the image sensors together based on their respective weights to create a single representation of the content. The system then transforms the single representation of the content into a task output that is representative of one or more physical attributes of the driver.

It is to be appreciated that while the present disclosure describes the face of a driver, the system may be employed by any type of user. In one embodiment, the image sensors may be used to monitor the face of any individual situated within the vehicle. Furthermore, although the embodiments describe the system employed within a vehicle, it is to be appreciated that the disclosure is not limited to a vehicle. Instead, the disclosure may be used in a variety of other applications that do not require a driver, pilot, or any other individual who is responsible for navigating a vehicle. That is, in other words, the disclosure may be used to determine the physical attributes of a user who is not situated in or is responsible for navigating a vehicle.

The image sensors may be any device configured to detect and convey data that represents an image such as, but are not limited to, cameras, red, green, and blue (RGB) light sensors, infrared sensors, depth sensors, and the like. The system includes two or more image sensors that are each positioned in unique locations so as to capture different views of the driver's face. For example, in the embodiments as described three image sensors are provided, where a first image sensor is positioned to the right of the driver, a second image sensor is positioned at the center with respect to the driver, and a third image sensor is positioned to the left of the driver. However, it should be appreciated that the image sensors may be arranged into other configurations as well.

As explained in greater detail below, the system may be configured to calculate a compressed version of the content generated by the image sensors by discarding irrelevant information and retaining relevant information. Irrelevant information may be content that is not required or useful in determining one or more physical attributes of the driver, and the relevant information includes the content that is required or useful in determining the physical attributes of the driver. The compressed version of the content may be calculated by a feature extractor such as a neural network. More specifically, the feature extractor is configured to reduce the content from each of the image sensors into a representation of respective semantic content. That is, the content from each of the image sensors is converted into a common language.

The system is configured to actively re-weight the compressed version of the content generated by the image sensors based on the importance their respective content. More specifically, in one approach content provided by one or more image sensors that is of little or negligible value when determining one or more physical attributes of the driver may be temporarily omitted. Similarly, content provided by other image sensors that is particularly informative may be given priority. This is because sometimes one or more of the image sensors may provide content that is of negligible value to the system at a certain point of time. For example, one or more image sensors may be momentarily occluded by a driver's hand, vehicle equipment (e.g., steering wheel), or other objects in the vehicle. Therefore, the system is configured to actively monitor the content of the various image sensors to determine which image sensor provides the most useful information.

The system is configured to merge the re-weighted compressed content together based on the respective weights of the sensors to create a single representation of the content. The system is configured to transform single representation of the content, which is descriptive of one or more visual attributes of the driver, into one or more task outputs. The task output is representative of one or more physical attributes of the driver. The task output indicates one or more characteristics of the driver such as, for example, gaze direction, mental state, emotion, identity recognition, facial expressions, movement of the driver's head, tasks involving the driver's head, and the like.

The vehicle systems for actively re-weighting content provided by a plurality of image sensors to determine one or more task outputs will be described in more detail herein with specific reference to the corresponding drawings.

Referring now to FIG. 1, an example vehicle 100 configured to actively re-weight the content provided by one or more image sensors to determine one or more task outputs is schematically depicted. The vehicle 100 may be any passenger vehicle such as, for example, a terrestrial, aquatic, and/or airborne vehicle. The vehicle 100 may include a communication path 104, an electronic control unit 102, a driver detection system 130, an autonomous control system 140, and one or more vehicle systems 150. The electronic control unit 102 may include one or more processors 106, and one or more memory modules 108.

As explained in greater detail below, the driver detection system 130 includes a plurality of driver-facing image sensors 132, where electronic control unit 102 actively re-weights the content generated by the image sensors 132 based on their respective importance. More specifically, the electronic control unit 102 actively re-weights to image sensors 132 based on the value or usefulness of their respective contents when determining one or more physical attributes of the driver of the vehicle 100. The electronic control unit 102 determines one or more physical attributes of the driver based on the weighted content of the image sensors 132. Some examples of the physical attributes of the driver include, but are not limited to, gaze direction, mental state, emotion, identity recognition, facial expressions, movement of the driver's head, tasks involving the driver's head, and the like.

Still referring to FIG. 1, the communication path 104 that provides data interconnectivity between various modules is disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In another embodiment, the communication path 104 may be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The electronic control unit 102 may be any computing device. For instance, the electronic control unit 102 may be any type of vehicle-installed, handheld, desktop, or other form of single computing device, or may be composed of multiple computing devices. The electronic control unit 102 includes one or more processors 106 for controlling operations of the electronic control unit communicatively coupled with one or more memory modules 108 over the communication path of the vehicle 100. The one or more processors 106 may include any device capable of executing machine-readable instructions stored on a non-transitory computer-readable medium. Accordingly, each of the one or more processors 106 may include a controller, an integrated circuit, a microchip, a computer, and/or any other computing device.

The electronic control unit 102 further includes one or more memory modules 108 communicatively coupled to the one or more processors 106 over the communication path 104. The one or more memory modules 108 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 108 may be configured to store one or more pieces of logic as described in more detail below. The embodiments described herein may utilize a distributed computing arrangement to perform any portion of the logic described herein.

In the embodiments described herein, the one or more memory modules 108, the one or more processors 106, and the network interface hardware 110 are integral with the electronic control unit 102. However, in another approach the electronic control unit 102, the one or more memory modules 108, the one or more processors 106, and the network interface hardware 110 may be discrete components communicatively coupled to one another without departing from the scope of the present disclosure.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 108 may include, for example, logic to permit the electronic control unit 102 to actively re-weight the image sensors 132 and determine one or more physical attributes of the driver, as described below.

The driver detection system 130 is communicatively coupled to the electronic control unit 102 over the communication path 104. The driver detection system 130 includes the driver-facing image sensors 132. The image sensors 132 are configured to detect and convey content representative or that is descriptive of the driver's face. In other words, the image sensors 132 provide content that is descriptive of one or more visual attributes of the driver's face. For example, the content may indicate the position of the driver's eyes, if the driver's eyes are opened or closed, the expression of the driver's mouth (e.g., if the driver is smiling or pouting), and the like. The content may also indicate if the driver has an object placed on top of or within close proximity of his or her face. For example, the content may indicate that the driver is holding a telephone to his or her ear. In another example, the content may indicate that the driver is placing his or her hand over the mouth (i.e., when coughing, sneezing, or yawning). The content may also indicate the position or orientation of the driver's head. For example, the content may indicate that the driver is turning his or her head away from the front of the vehicle.

Some examples of the image sensors 132 include, but are not limited to cameras, red, green, and blue (RGB) light sensors, infrared sensors, depth sensors, and the like. In one embodiment, the image sensors 132 may all be of the same type, and in another embodiment each of the image sensors 132 includes a different type. That is, all of the image sensors 132 may be a camera, and in another embodiment one of the image sensors 132 is a camera, another is an infrared sensors, and the remaining sensor is a depth sensor.

Figure 2:
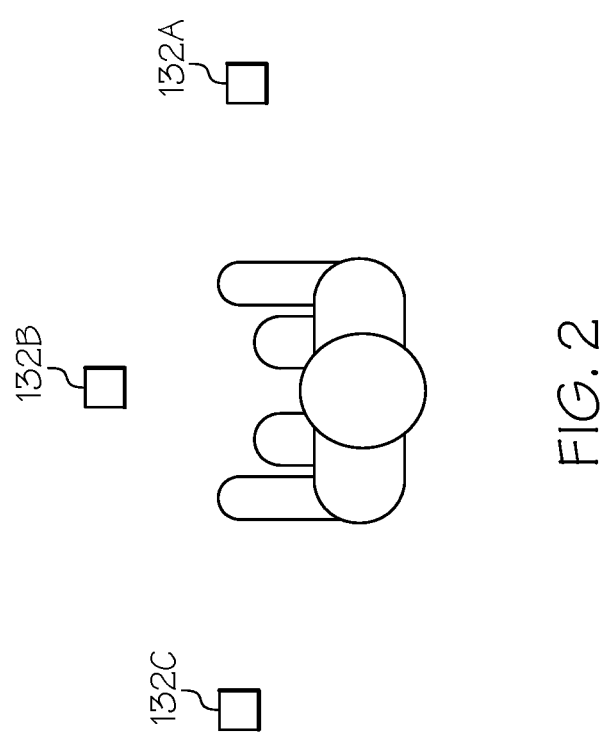
FIG. 2 schematically depicts the driver and the cameras shown in FIG. 1, according to one or more embodiments shown and described herein.

Each image sensor 132 is positioned at a unique angle facing the driver or other user. That is, the driver detection system 130 includes at least two image sensors 132 that are each positioned or angled so as to capture varying viewpoints of the driver's face. Turning now to FIG. 2, a schematic illustration of an exemplary driver detection system 130 including three image sensors 132 is shown. The driver detection system 130 includes a first image sensor 132A positioned to the right of the driver, a second image sensor 132B positioned at the center with respect to the driver, and a third image sensor 132C positioned to the left of the driver. Although FIG. 2 illustrates three image sensors 132A, 132B, 132C, it should be appreciated that the disclosed system may include any number of image sensors 132 arranged into a variety of other configurations.

The three image sensors 132A, 132B, 132C each provide content that is representative of a unique view of the driver. That is, the image sensors 132A, 132B, 132C provide three views of the driver that are captured at different vantage points. Referring to both FIGS. 1 and 2, the unique views of the driver are provided to the electronic control unit 102 over the communication path 104. As explained below, the electronic control unit 102 is configured to process the content of each image sensor 132A, 132B, 132C separately.

Turning back to FIG. 1, the autonomous control system 140 is communicatively coupled to the electronic control unit 102 over the communication path. The autonomous control system 140 is configured to produce control signals to various vehicle hardware systems to perform autonomous control of one or more vehicle functions. As non-limiting examples, the autonomous control system 140 is configured to send control signals to a braking system, a steering system, and a throttle system of the vehicle to autonomously control the vehicle 100 as appropriate. It should be appreciated that the control signals produced by the autonomous control system 140 may be based at least in part by the content provided by at least one of the image sensors 132, and is explained in greater detail below.

The vehicle systems 150 are communicatively coupled to the electronic control unit 102 over the communication path 104. The electronic control unit 102 may control the vehicle systems 150 autonomously. Some examples of vehicle systems 150 that may be controlled as the vehicle 100 operates autonomously include, but are not limited to, a propulsion system, a steering system, a stability control system, a navigation system, an energy system, and the like.

Figure 3:
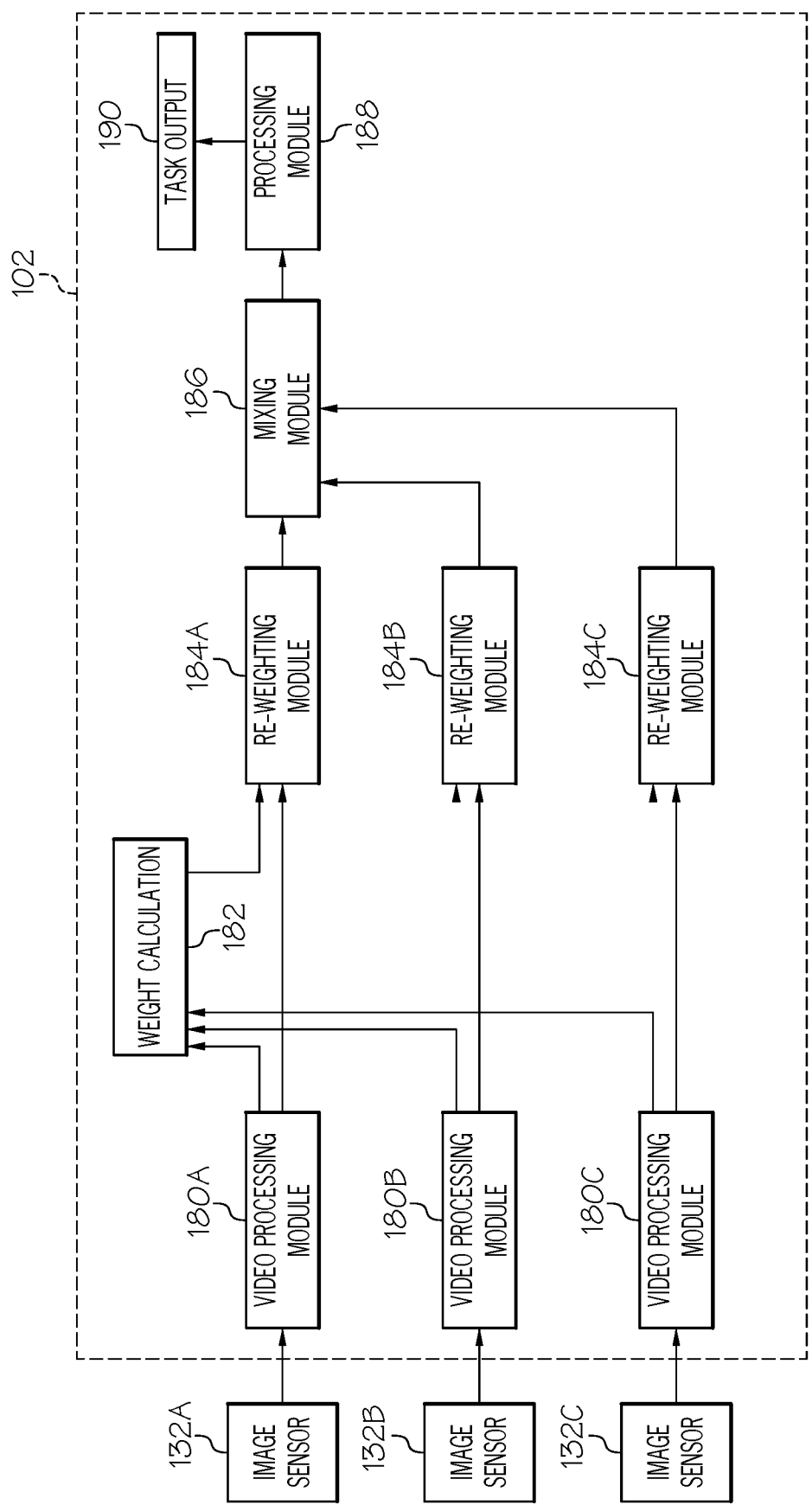
FIG. 3 illustrates a block diagram representing an exemplary electronic control unit for determining one or more task outputs based on the content of the cameras, according to one or more embodiments shown and described herein.

FIG. 3 is a block diagram of the electronic control unit 102 and the image sensors 132A, 132B, 132C. In the embodiment as shown, the electronic control unit 102 is in communication with each of the sensors 132A, 132B, 132C. The electronic control unit 102 may include video processing modules 180, a task-dependent weight calculation module 182, re-weighting modules 184, a mixing module 186, and a processing module 188. The processing module 188 of the electronic control unit 102 provides a task output 190. The task output 190 may be used to determine representative of one or more physical attributes of the driver. The representative of one or more physical attributes of the driver represent any feature that may be determined based on monitoring the driver's face or head (e.g., mental state, emotion, etc.).

The mental state of the driver may include characteristics such as, for example, drowsiness, level of attention, and the like. For example, in one embodiment the driver may yawn or close his or her eyes. Accordingly, the task output 190 may indicate the driver is falling asleep while driving. Some examples of emotions include, but are not limited to, surprise, anger, and the like. In still another embodiment, the task output 190 may indicate the various characteristics of the driver's eyes such as, for example, if the driver's eyes are fully opened or closed. In another embodiment, the task output 190 may indicate various facial expressions of the driver. In another embodiment, the task output 190 may indicate that the driver is placing an object proximate to his or her head and/or face (e.g., the driver is talking on a telephone or a headset).

Referring now to FIGS. 1 and 3, the electronic control unit 102 includes three video processing modules 180A, 180B, 180C, where each video processing module 180 is in communication with and receives content from a corresponding one of the image sensors 132A, 132B, 132C. Each video processing module 180A, 180B, 180C is configured to calculate a compressed version of the content generated by a corresponding one of the image sensors 132A, 132B, 132C. More specifically, in response to receiving the content from the plurality of image sensors 132A, 132B, 132C, the video processing modules 180A, 180B, 180C calculate the compressed version of content generated by a corresponding image sensor 132A, 132B, 132C separately by discarding irrelevant information and retaining relevant information. Irrelevant information may be content that is not required to determine one or more driver-dependent tasks, and the relevant information includes the content that is required to determine the driver-dependent tasks. Irrelevant information may include, for example, the texture or fabric of the driver's seat, the driver's hairstyle, or the color of the driver's clothes. In contrast, information such as images of the driver's eyes, mouth, or other facial features may be relevant when determining some of the driver-dependent tasks. It should be appreciated that the video processing modules 180A, 180B, 180C may cull or reduce the volume of the original content captured by the image sensors 132A, 132B, 132C.

The compressed version of the content may be calculated by a feature extractor such as a neural network. More specifically, the feature extractor is configured to reduce the content from each of the image sensors 132 into a representation of respective semantic content. That is, the content from each of the image sensors 132A, 132B, 132C is converted into a common language, where the content from one of the image sensors 132A, 132B, 132C is in the same format and is combinable with the content from each of the remaining image sensors 132. For example, if one of the image sensors 132A was a depth sensor and the remaining sensors 132B, 132C were cameras, then the content would need to be in the same format or language in order to be combined.

The compressed content from the video processing modules 180A, 180B, 180C are sent to the weight calculation module 182 and the re-weighting modules 184. The weight calculation module 182 may rank or assign respective weights to each of the image sensors 132 based on the amount of content that each image sensor 132 provides that is usable to determine one or more physical attributes of the driver. More specifically, the weight calculation module 182 may be trained to learn the value of certain content to determine a particular task, and then weights the image sensors 132A, 132B, 132C based on the content generated that is material in calculating the task. For example, the task of gaze estimation relies heavily on the eyes of an individual. Thus, the weight calculation module 182 may learn that content where the driver's eyes are not visible is of little or no use. Accordingly, the weight calculation module 182 may discard the content where the driver's eyes are blocked.

It is to be appreciated that the weight calculation module 182 actively re-weights the image sensors 132. That is, the weight calculation module 182 receives a stream of content from the sensors 132 and actively re-weights the image sensors 132 over a period of time based on the content provided by each of the image sensors 132. The weight calculation module 182 may need to re-adjust the weights of each of the image sensors 132 over time along with the dynamic or constantly changing conditions associated with the driver. For example, a driver may move his or her hands and block one of the image sensors 132. Alternatively, in another example the lighting conditions may change so as to obscure a portion of the driver's face (e.g., one or both of the driver's eyes, mouth, etc.). Therefore, the image sensors 132 are re-weighted to reflect the dynamic conditions of the driver.

The respective weights of the sensors 132A, 132B, 132C are then sent to the re-weighting modules 184A, 184B, 184C. The re-weighting modules 184A, 184B, 184C may then re-weight the compressed content from the video processing modules 180A, 180B, 180C based on the respective weights determined by the weight calculation module

182. The re-weighting modules 184A, 184B, 184C may then send the re-weighted compressed content to the mixing module 186.

The mixing module 186 is configured to merge the re-weighted compressed content together based on the respective weights of the sensors 132 to create a single representation of the content. In one non-limiting embodiment, the re-weighted compressed content may be merged based on a merge by valid approach. The merge by valid approach involves setting the weight for a particular stream of content that is invalid to zero (i.e., the stream of content corresponding to an image sensor that is unable to detect the driver's face is set to zero). The remaining weights are normalized so that their sum is 1.

In another embodiment, the re-weighted compressed content may be merged based on a merge by mean confidence approach. The merge by mean confidence approach is identical to the merge by valid approach, except that the valid weights are further weighted by a confidence value. In other words, the remaining weights that are non-zero are weighted by the confidence value. The confidence value may be learned based on a sigmoid activation that is branched from the output of each neural sub-network provided by the video processing modules 180A, 180B, 180C.

In still another embodiment, the re-weighted compressed content may be merged based on a merge by maximum confidence approach. The merge by maximum confidence approach is identical to the merge by mean confidence approach, except that the sub-network features are merged using an element-wise maximum value rather than a mean value. It is to be appreciated that although the disclosure describes the merge by valid approach, the merge by mean confidence approach, and the merge by maximum confidence approach, the disclosure is not limited to these particular approaches.

The processing module 188 receives as input the single representation of the content from the mixing module 186, and determines the task output 190 based on the input. More specifically, the processing module 188 transforms single representation of the content, which is descriptive of one or more visual attributes of the driver, into the task output 190. The task output 190 is representative of one or more physical attributes of the driver. More specifically, the single representation of the content is representative of one or more visual attributes of the driver. For example, the single representation of the content may indicate visual attributes such as the position of the driver's gaze, any facial expressions, whether or not the driver's mouth is opened, and the like. The visual attributes may also indicate that a portion of the driver's face is obstructed or otherwise hidden from view as well. For example, driver may cover their mouth with their hands. In another example, a portion of the driver's face may not be visible due to lighting constraints.

The processing module 188 transforms the visual attributes of the driver into the physical attributes represented by the task output 190. More specifically, the physical attributes of the driver may include, for example, a driver's gaze direction, mental state, emotion, identity recognition, and the like. For example, the macro features may include a Yes or No answer to questions such as "Is the person tired?", "Is the person angry?", "Is the person yawning?" and the like. In another example, the task output 190 may indicate characteristics such as a specific direction of the driver's gaze. The processing module 188 may include either a neural network or kernel function that is configured to transform the single representation into the task output 190. More specifically, in one embodiment the neural network may be a fully connected neural network having one or two hidden layers.

Referring to both FIGS. 1 and 3, the task output 190 may be communicated over the communication path 104 to the autonomous control module 170. The autonomous control module 170 generates control signals based at least in part on the task output 190, where the control signals are provided to various vehicle hardware systems to perform autonomous control of one or more vehicle functions. For example, the task output 190 may indicate that the driver's head is slumped down and that his or her eyes are shut or almost shut. Thus, the driver may be drowsy and is falling asleep while operating the vehicle 100. Accordingly, the vehicle 100 may be autonomously controlled, since the driver is incapacitated by a lack of sleep. The electronic control unit 102 may then instruct the autonomous control module 170 to provide control signals to one or more vehicle systems 150 based on the in order to autonomously control the vehicle 100.

Figure 4:
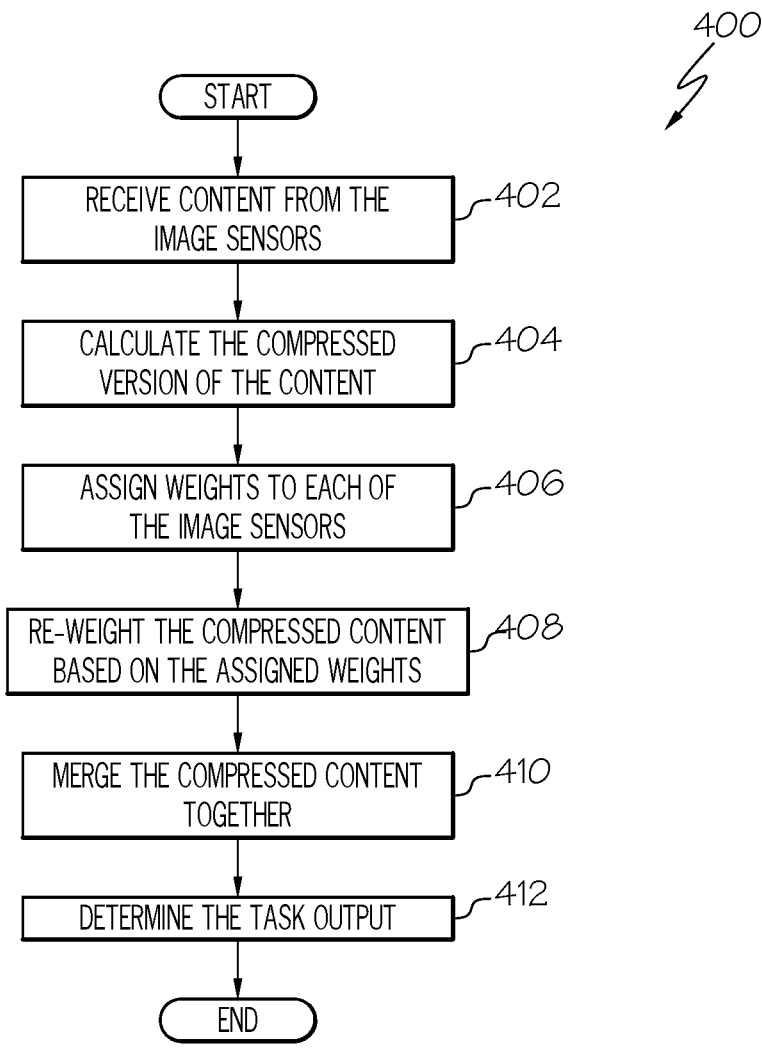
FIG. 4 illustrates an exemplary flow diagram of a process for determining one or more task outputs based on the content provided by one or more cameras, according to one or more embodiments shown and described herein.

Referring now to FIG. 4, a flowchart 400 depicting a method for determining the task output 190 based on the content of the image sensors 132 is shown. It should be understood that embodiments are not limited by the order of steps of the flowchart 400 of FIG. 4.

Referring to FIGS. 1, 2, and 4, in block 402 the electronic control unit 102 receives the content generated by the image sensors 132. As mentioned above, the content generated by the image sensors 132 is descriptive of one or more visual attributes of the driver. The method may then proceed to block 404.

In block 404, the electronic control unit 102 calculates the compressed version of content generated by the image sensors 132A, 132B, 132C separately by a corresponding one of the video processing modules 180A, 180B, 180C. The compressed content may be calculated by a feature extractor such as a neural network. More specifically, the feature extractor is configured to reduce the content from each of the image sensors 132 into a representation of respective semantic content. The method may then proceed to block 406.

In block 406, the weight calculation module 182 of the electronic control unit 102 may rank or assign respective weights to each of the image sensors 132 based on the amount of content that each image sensor 132 provides that is usable to determine one or more physical attributes of the driver. The method may then proceed to block 408.

In block 408, the re-weighting modules 184A, 184B, 184C of the electronic control unit 102 may re-weight the compressed content from the video processing modules 180A, 180B, 180C based on the respective weights determined by the weight calculation module 182. The method may then proceed to block 410.

In block 410, the mixing module 186 of the electronic control unit 102 merges the re-weighted compressed content together based on the respective weights of the sensors 132 to create the single representation of the content. The method may then proceed to block 412.

In block 412, the processing module 188 of the electronic control unit 102 receives as input the single representation of the content from the mixing module 186, and determines the task output 190 based on the input. That is, the processing module 188 transforms single representation of the content, which is descriptive of one or more visual attributes of the driver, into the task output 190, which is representative of one or more physical attributes of the driver. The method may then terminate.

It should now be understood that embodiments described disclose a system including multiple cameras, where the system learns to weight content generated by each camera. More specifically, the system is configured to actively re-weight the content of each image sensor based on the usefulness or value of the content. Therefore, in the event one or more cameras are occluded, the system may still receive input by another camera that is not occluded. Conventional systems may use only one camera to monitor a driver's face. Sometimes the camera may provide poor imagery due to reasons such as vantage point, occlusion, overexposure, and the like. As a result, the system may be unable to determine an accurate representation of the driver's face. In contrast, the disclosed camera system provides an approach for selecting the camera or cameras providing the most valuable or useful content to determine the state of the driver, and may discard content that provides negligible information about the driver. As a result, the disclosed system may increase performance by providing a more consistent stream of useful image data.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system, comprising:
  a plurality of image sensors that output content descriptive of one or more visual attributes of a user, wherein each of the plurality of image sensors are positioned at a unique angle facing the user;
  one or more processors; and
  one or more non-transitory memory modules communicatively coupled to the one or more processors and storing machine-readable instructions that, when executed, cause the one or more processors to perform at least the following:
    receive the content from the plurality of image sensors;
    assign respective weights to each of the plurality of image sensors based on the content, wherein the respective weights of the plurality of image sensors are actively re-weighted over a period of time;
    merge the content of the plurality of image sensors together based on the respective weights to create a single representation of the content; and
    transform the single representation of the content into a task output, wherein the task output is representative of one or more physical attributes of the user.

2. The system of claim 1, wherein the machine-readable instructions further cause the one or more processors to:
  in response to receiving the content from the plurality of image sensors, calculate a compressed version of the content generated by each of the plurality of image sensors separately by a feature extractor.

3. The system of claim 2, wherein the compressed version of the content generated by each of the plurality of image sensors are in the same format as one another such that the content from one of the plurality of image sensors is combinable with the content of the remaining plurality of image sensors.

4. The system of claim 1, wherein assigning the respective weights to each of the plurality of image sensors is based on an amount of the content that a discrete image sensor provides that is useable when determining the one or more physical attributes of the user.

5. The system of claim 1, wherein merging the content of the plurality of image sensors together to create the single representation of the content is based on one of the following:
  a merge by valid approach including setting a weight for a particular stream of content that is invalid to zero and a weight of a remaining plurality of streams of content are normalized such that their combined sum is one;
  a merge by mean confidence approach that is identical to the merge by valid approach except that the weight of the remaining plurality of streams of content are further weighted by a confidence value; and
  a merge by maximum confidence approach that is identical to the merge by mean confidence approach except that a sub-network features are merged using an element-wise maximum value rather than a mean value.

6. The system of claim 1, wherein the machine-readable instructions further cause the one or more processors to:
  transform the single representation of the content into the task output based on either a neural network or a kernel function.

7. The system of claim 1, wherein the task output includes at least one of gaze direction, mental state, emotion, identity recognition, facial expressions, movement of a head of the user, and tasks involving the head.

8. The system of claim 1, wherein the image sensors include two or more of: a camera, a red, green, and blue (RGB) light sensor, an infrared sensor, and a depth sensor.

9. The system of claim 1, wherein the system is part of a vehicle, and wherein the machine-readable instructions further cause the one or more processors to:
  autonomously control at least one vehicle system based on the task output.

10. A vehicle, comprising:
  a plurality of image sensors that output content descriptive of one or more visual attributes of a user, wherein each of the plurality of image sensors are positioned at a unique angle facing the user;
  one or more processors; and
  one or more non-transitory memory modules communicatively coupled to the one or more processors and storing machine-readable instructions that, when executed, cause the one or more processors to perform at least the following:
    receive the content from the plurality of image sensors;
    assign respective weights to each of the plurality of image sensors based on the content, wherein the respective weights of the plurality of image sensors are actively re-weighted over a period of time;
    merge the content of the plurality of image sensors together based on the respective weights to create a single representation of the content;
    transform the single representation of the content into a task output, wherein the task output is representative of one or more physical attributes of the user; and
    autonomously control at least one vehicle system based on the task output.

11. The vehicle of claim 10, wherein the machine-readable instructions further cause the one or more processors to:
  in response to receiving the content from the plurality of image sensors, calculate a compressed version of the content generated by each of the plurality of image sensors separately by a feature extractor.

12. The vehicle of claim 11, wherein the compressed version of the content generated by each of the plurality of image sensors are in the same format as one another such that the content from one of the plurality of image sensors is combinable with the content of the remaining plurality of image sensors.

13. The vehicle of claim 10, wherein assigning the respective weights to each of the plurality of image sensors is based on an amount of the content that a discrete image sensor provides that is useable when determining the one or more physical attributes of the user.

14. The vehicle of claim 10, wherein merging the content of the plurality of image sensors together to create the single representation of the content is based on one of the following:
   a merge by valid approach including setting a weight for a particular stream of content that is invalid to zero and a weight of a remaining plurality of streams of content are normalized such that their combined sum is one;
   a merge by mean confidence approach that is identical to the merge by valid approach except that the weight of the remaining plurality of streams of content are further weighted by a confidence value; and
   a merge by maximum confidence approach that is identical to the merge by mean confidence approach except that a sub-network features are merged using an element-wise maximum value rather than a mean value.

15. The vehicle of claim 10, wherein the machine-readable instructions further cause the one or more processors to:
   transform the single representation of the content into the task output based on either a neural network or a kernel function.

16. The vehicle of claim 10, wherein the task output includes at least one of gaze direction, mental state, emotion, identity recognition, facial expressions, movement of a head of the user, and tasks involving the head.

17. The vehicle of claim 10, wherein the image sensors include two or more of: a camera, a red, green, and blue (RGB) light sensor, an infrared sensor, and a depth sensor.

18. A method, comprising:
   receiving, by a computer, content from a plurality of image sensors, wherein the plurality of image sensors output content descriptive of one or more visual attributes of a user and are positioned at a unique angle facing the user;
   assigning respective weights to each of the plurality of image sensors based on the content, wherein the respective weights of the plurality of image sensors are actively re-weighted over a period of time;
   merging the content of the plurality of image sensors together based on the respective weights to create a single representation of the content; and
   transforming the single representation of the content into a task output, wherein the task output is representative of one or more physical attributes of the user.

19. The method of claim 18, further comprising:
   in response to receiving the content from the plurality of image sensors, calculating a compressed version of the content generated by each of the plurality of image sensors separately by a feature extractor.

20. The method of claim 18, further comprising:
   transforming the single representation of the content into the task output based on either a neural network or a kernel function.

* * * * *